Figure 1:
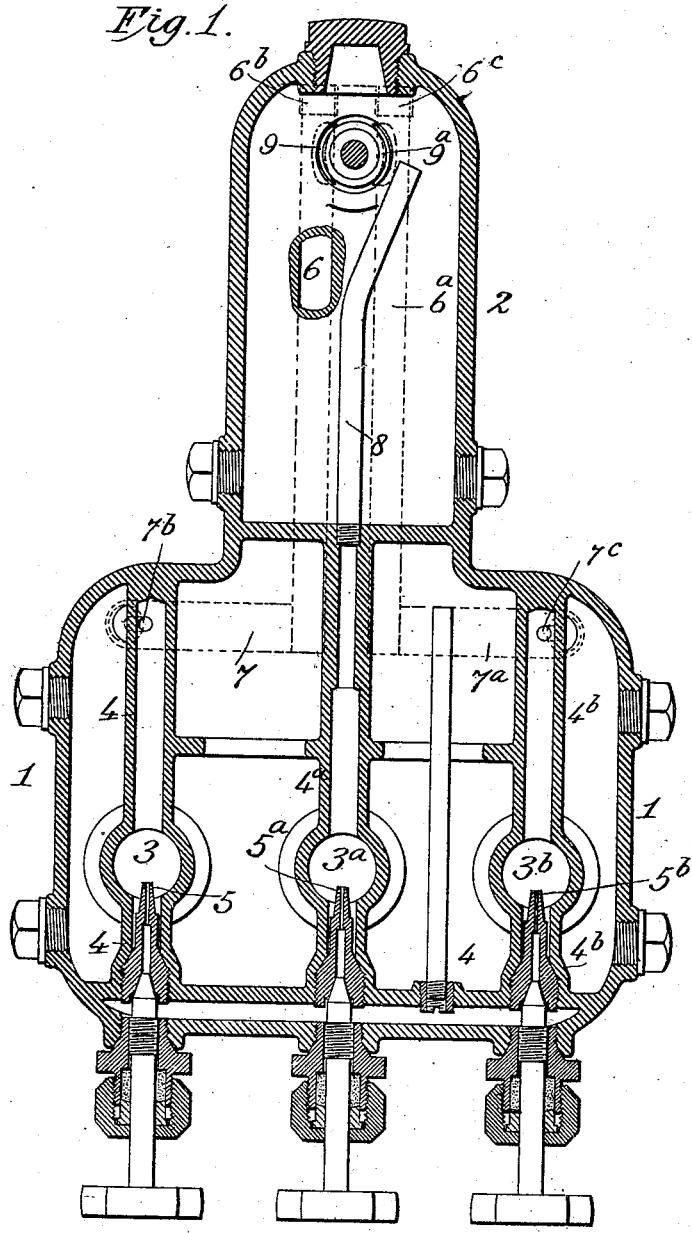

No. 886,368. PATENTED MAY 5, 1908.
C. B. & F. W. HODGES.
LUBRICATOR.
APPLICATION FILED SEPT. 12, 1903.

3 SHEETS—SHEET 1.

Witnesses
Sidney P. Hollingsworth
C. B. Bull

Inventors
Clarence B. Hodges,
Frederick W. Hodges,
by
Attorneys

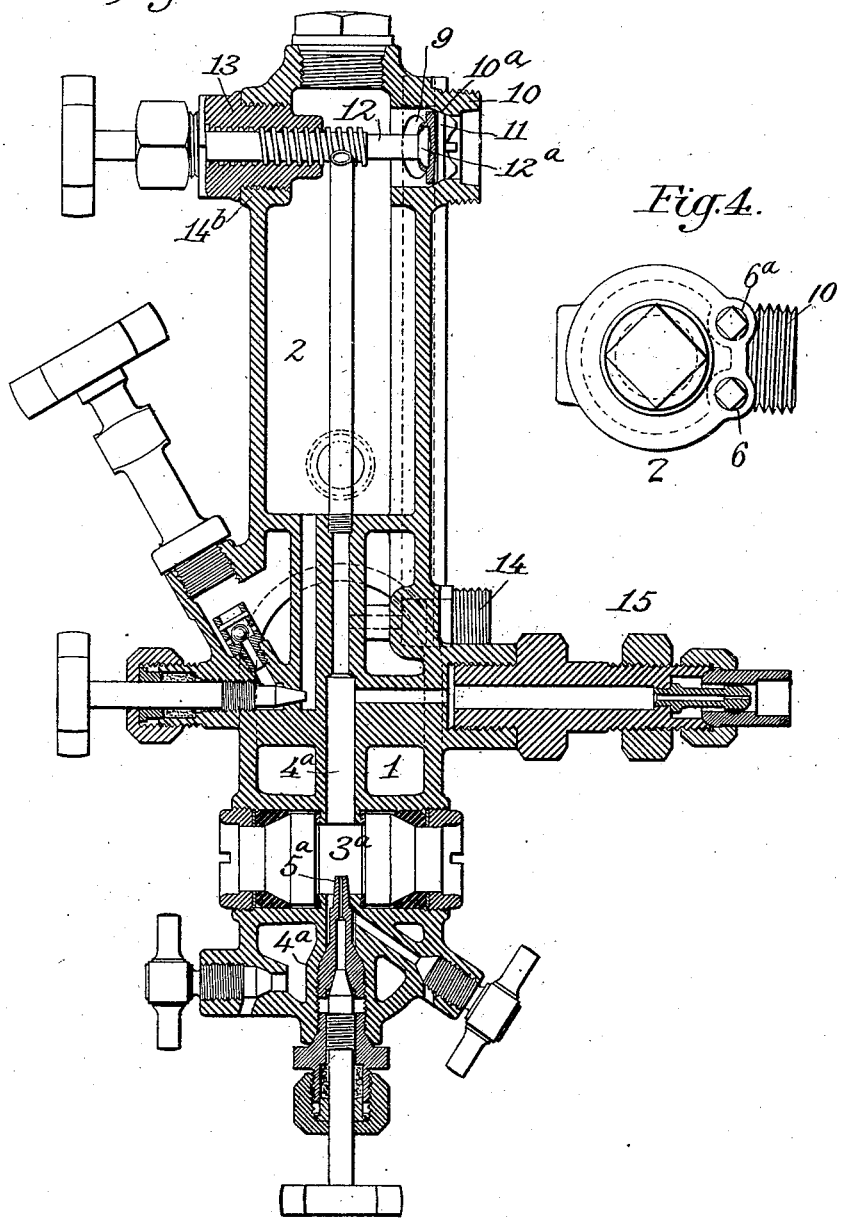

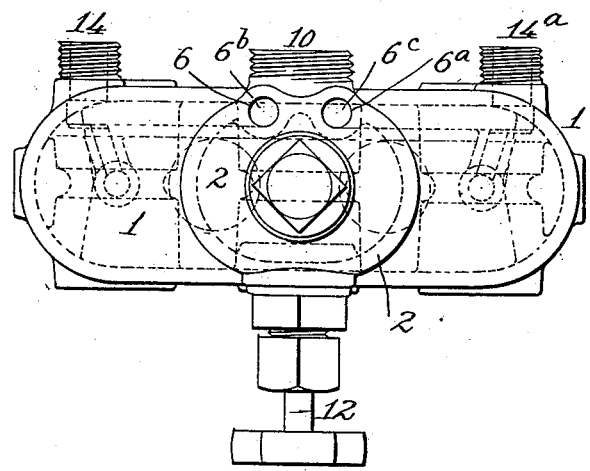

UNITED STATES PATENT OFFICE.

CLARENCE BIDWELL HODGES AND FREDERICK WALTER HODGES, OF DETROIT, MICHIGAN.

LUBRICATOR.

No. 886,368.       Specification of Letters Patent.       Patented May 5, 1908.

Application filed September 12, 1903. Serial No. 172,933.

*To all whom it may concern:*

Be it known that we, CLARENCE B. HODGES and FREDERICK W. HODGES, citizens of the United States, residing at Detroit, in the county of Wayne and State of Michigan, have invented certain new and useful Improvements in Lubricators, of which the following is a specification, reference being had to the accompanying drawings, forming part thereof.

Our invention relates, more specifically, to an improvement in what is known as condensation displacement lubricators, and especially to such as are used in connection with locomotives, and wherein the lubricant rises in drops through a body of water into the tallow pipe, passing thence to the points to be lubricated, as the locomotive cylinders, the air brake pump cylinder, or other parts.

A lubricator of the general type to which our present invention is specially adaptable is described in our former patent No. 752,554, dated Feb. 16, 1904, and several of the parts herein shown, and to some extent described, but not claimed, constitute features of the invention therein claimed; as, for example, the arrangement of the axis of the oil reservoir in a substantially horizontal plane, the employment of horizontal and vertical tubes within the reservoir serving to brace the same, and of sight feed glasses having horizontal axes, said glasses being mounted in pairs within portions of said tubular bracing, and so arranged as to constitute mirrors and reflect for observation the position and movement of liquid. In addition to such general features there are also herein shown certain details, which are more particularly described, shown and claimed in our said former patent; and therefore, many of the said general and special features herein illustrated do not require full description, but for an accurate understanding of the same reference may be had thereto.

In the accompanying drawings, Figure 1 is a vertical section of a lubricator in which our invention is incorporated, the section being in the line of the axis of the reservoir. Fig. 2 is a vertical section in a line transverse to the axis of the reservoir. Fig. 3 is a plan view of Fig. 1. Fig. 4 shows a detail hereinafter explained.

Similar numerals of reference indicate similar parts in the respective figures.

1 represents the reservoir which receives the oil and the water of condensation.

2 is the condenser, which, by preference is integral with the reservoir, the latter being provided with tubular chambers 3, $3^a$ and $3^b$ which, in practice, are preferably integral therewith; and 4, $4^a$ and $4^b$ indicate oil pipes, each one of which intersects one of the tubular chambers, the combined construction adapting the reservoir to withstand the high pressures to which it is subjected. In the horizontal tubular chambers 3, $3^a$ and $3^b$ are mounted in pairs the sight feed features, including glasses of the bull's eye type, packings and caps, between each pair of which glasses extend the oil feed nozzle 5, $5^a$ or $5^b$, so that the ascending drops of oil passing through the condense-water on their way to the points to be lubricated, are visible.

In our Patent No. 752,554 the equalizing tubes occupy the more ordinary position, that is to say, are situated outside of the condenser. In our present invention, the equalizing tubes 6, $6^a$ are formed as parts of the wall of the condenser, being preferably integral or cast therewith. In other forms of lubricators of this class, the equalizing tubes are arranged who ly internally of the condenser; and, in consequence, in some instances, as where three such internally arranged tubes are employed, three currents of live steam pass down through the condenser, thus heating the water and greatly retarding condensation. This is an objection which is overcome by one feature of our invention.

One objection to the more ordinary location of the equalizing tubes entirely exterior of the condenser is that space is unnecessarily occupied. In our present invention, by placing the equalizing tubes as shown, that is to say, within or as parts of the wall of the condenser, only a portion of the surface of each tube, or a segment of the tube, is exposed to the water of condensation in the lubricator, and in consequence the condensing action is enhanced, and by such arrangement advantages attendant upon placing the tubes entirely outside of the lubricator are obtained, while the size or lateral compass of the lubricator is materially decreased, which is a consideration of importance. The equalizing tubes 6, 6ª, constituting as shown parts of the wall of the condenser, terminate in the passages 7, 7ª which communicate with the oil pipes 4, and 4ᵇ, through the oil passages 7ᵇ and 7ᶜ, the central oil pipe 4ª having independent equalizing tube 8. Steam enters the tubes 6, 6ª through the ports 9, 9ª. The upper ends of the tubes are closed by screw plugs 6ᵇ, 6ᶜ. The object of making the upper ends of the tubes open is to aid in the casting operation; and these open ends are conveniently closed by means of the plugs.

A plug and its attachment to an open-ended tube is shown in Fig. 4. An additional advantage of this construction is that the tube may be cast solid and a hole subsequently drilled, thus obviating the possibility of blow holes in the casting; and furthermore, if the hole is cast the open end of the tube admits of the convenient insertion of a wire to clean away the sand.

It will be understood that the connections 14, 14ª are those leading to the cylinders on the respective sides of the locomotive, and 15 the one leading to the pump cylinder of the air brake.

Another feature of our invention consists in the placing of the steam or boiler valve, for supplying and shutting off the boiler pressure to and from the lubricator, within the condenser, the advantages of which arrangement are economy in construction, and convenience and utility in operation, the handle of the valve being in front of the lubricator within ready reach of the attendant.

In other constructions, the steam or boiler valve is a separate fitting which is arranged in a position removed from the lubricator proper, and in most cases so as to be practically inaccessible. Referring more particularly to Fig. 2, it will be seen that the interior of the threaded projection or boss 10 which receives the steam pipe leading from the boiler is provided with a seat 10ª, upon which is seated the valve 11, the stem 12 of which is threaded in a bearing 13 which, in turn, is screwed into the threaded boss 14ᵇ at the front upper portion of the condenser, the stem being furnished with the necessary packing devices. The valve has preferably an annular projection upon its inner side, which is spun over the head 12ª of the stem 12, there being a slight play left between the valve and the stem to allow the former to adjust itself to its seat. A valve having a solid stem may, however, be employed. It will be seen that the location here adopted for the steam or boiler valve, that is to say, wholly within the condenser, and with its valve stem and operative handle extending out from the front of the lubricator, allows the operator to have at all times ready access to the valve, while other advantages are found in economy of space and cheapness of construction. Furthermore, by placing the valve 11 adjacently to the ports 9, 9ª of the equalizing tubes 6, 6ª, the steam under boiler pressure admitted through the pipe connecting with the boss 10 enters the condenser proper and the equalizing tubes simultaneously, an action believed to be entirely novel.

We do not restrict ourselves to the exact details of construction, combination and arrangement herein set forth, it being obvious that minor variations thereof, not involving the exercise of invention, may be made by the skilled mechanic; and such departures from what is herein described and claimed, not involving invention, we consider as within the scope and terms of our claims.

Having thus described our invention, we claim:—

1. In a lubricator, a reservoir and a condenser, said parts being integral, the condenser having laterally-ported equalizing tubes formed within or as parts of the wall of the condenser whereby only a portion of the surface of each tube, or a segment of the tube, is exposed to the water of condensation in the lubricator, combined with means for controlling the admission of boiler pressure to the condenser and equalizing tubes, substantially as set forth.

2. In a lubricator, a reservoir and a condenser, said parts being integral, said reservoir being provided with integral oil pipes and passages communicating therewith and the condenser with laterally-ported equalizing tubes formed within or as parts of the wall of the condenser whereby only a portion of the surface of each tube, or a segment of the tube, is exposed to the water of condensation in the lubricator, said tubes being connected with said passages, combined with means for controlling the admission of boiler pressure to the condenser and equalizing tubes, substantially as set forth.

3. In a lubricator, the combination of a reservoir and a condenser, said reservoir being provided with oil pipes and passages communicating therewith, and the condenser with equalizing tubes contained within its wall and communicating with said passages, and means connected with said condenser for controlling boiler pressure admitted to the condenser and to the equalizing tubes, substantially as set forth.

4. In a lubricator, the combination of a reservoir and a condenser, said reservoir being provided with oil pipes and passages communicating therewith and the condenser with equalizing tubes contained within its wall, said equalizing tubes also communicating with said passages, being open at their tops, and provided near the upper part of the condenser with lateral inlets, means for closing the open ends of said equalizing tubes, and means connected with the condenser for controlling steam under boiler pressure admitted to the condenser and to the equalizing tubes, substantially as set forth.

5. The combination in a lubricator of a reservoir, a condenser, equalizing tubes, and valvular means whereby steam under boiler pressure is commonly admitted to the condenser and to the equalizing tubes, substantially as set forth.

In testimony whereof we hereunto set our hands.

CLARENCE BIDWELL HODGES.
FREDERICK WALTER HODGES.

In presence of—
   JOHN COYNE,
   EDWIN C. NAGEL.